United States Patent [19]

Gillberg-LaForce

[11] Patent Number: 5,839,608
[45] Date of Patent: Nov. 24, 1998

[54] STRETCH-ACTIVATED CONTAINER

[75] Inventor: Gunilla Elsa Gillberg-LaForce, Roswell, Ga.

[73] Assignee: Kimberly-Clark Worldwide, Inc., Neenah, Wis.

[21] Appl. No.: 791,277

[22] Filed: Jan. 30, 1997

Related U.S. Application Data

[63] Continuation of Ser. No. 493,766, Jun. 22, 1995, Pat. No. 5,741,564.

[51] Int. Cl.$^6$ .............................. B67D 3/00; B65D 35/08
[52] U.S. Cl. ................................ 222/1; 222/107; 222/215
[58] Field of Search ................................ 222/1, 107, 215

[56] References Cited

U.S. PATENT DOCUMENTS

| | | | |
|---|---|---|---|
| Re. 33,646 | 7/1991 | Klemm et al. | 252/90 |
| 2,389,736 | 11/1945 | Muise | 252/91 |
| 3,016,599 | 1/1962 | Perry | 28/78 |
| 3,341,394 | 9/1967 | Kinney | 161/72 |
| 3,485,562 | 12/1969 | Hidden et al. | 401/134 |
| 3,630,800 | 12/1971 | Nash et al. | 156/229 |
| 3,655,862 | 4/1972 | Dorschner et al. | 264/290 |
| 3,692,618 | 9/1972 | Dorschner et al. | 161/72 |
| 3,704,198 | 11/1972 | Prentice | 161/148 |
| 3,705,068 | 12/1972 | Dobo et al. | 156/441 |
| 3,725,520 | 4/1973 | Suzuki et al. | 264/41 |
| 3,755,527 | 8/1973 | Keller et al. | 264/210 |
| 3,801,404 | 4/1974 | Druin et al. | 156/229 |
| 3,802,817 | 4/1974 | Matsuki et al. | 425/66 |
| 3,849,241 | 11/1974 | Butin et al. | 161/169 |
| 3,853,651 | 12/1974 | Porte | 156/73.6 |
| 3,855,046 | 12/1974 | Hansen et al. | 161/150 |
| 3,978,185 | 8/1976 | Buntin et al. | 264/93 |
| 4,064,605 | 12/1977 | Akiyama et al. | 28/103 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,104,432 | 8/1978 | Clothier et al. | 206/0.5 |
| 4,118,531 | 10/1978 | Hauser | 428/224 |
| 4,330,220 | 5/1982 | Schaar et al. | 401/134 |
| 4,340,563 | 7/1982 | Appel et al. | 264/518 |
| 4,395,261 | 7/1983 | Lutz | 8/111 |
| 4,405,297 | 9/1983 | Appel et al. | 425/72 |
| 4,430,013 | 2/1984 | Kaufman | 401/132 |
| 4,434,204 | 2/1984 | Hartman et al. | 428/198 |
| 4,448,704 | 5/1984 | Barby et al. | 252/91 |
| 4,472,328 | 9/1984 | Sugimoto et al. | 264/41 |
| 4,493,868 | 1/1985 | Meitner | 428/171 |
| 4,515,703 | 5/1985 | Haq | 252/92 |
| 4,519,909 | 5/1985 | Castro | 210/500 |
| 4,627,811 | 12/1986 | Greiser et al. | 425/72 |
| 4,644,045 | 2/1987 | Fowells | 526/348 |
| 4,663,220 | 5/1987 | Wisneski et al. | 428/221 |
| 4,797,310 | 1/1989 | Barby et al. | 428/71 |
| 4,820,435 | 4/1989 | Zafiroglu | 252/90 |
| 4,839,076 | 6/1989 | Willman et al. | 252/90 |
| 4,891,389 | 1/1990 | Graiver et al. | 521/64 |
| 4,904,524 | 2/1990 | Yoh | 428/311.3 |
| 4,915,301 | 4/1990 | Munteanu | 239/45 |
| 4,917,301 | 4/1990 | Munteanu | 239/43 |
| 4,925,327 | 5/1990 | Wirt | 401/205 |
| 4,948,047 | 8/1990 | Zembrodt | 239/34 |
| 5,238,760 | 8/1993 | Takahashi et al. | 429/194 |
| 5,308,665 | 5/1994 | Sadek et al. | 428/131 |
| 5,741,564 | 4/1998 | Gillberg-LaForce | 428/35.2 |

FOREIGN PATENT DOCUMENTS

91/10375  7/1991  WIPO.

OTHER PUBLICATIONS

V.A. Wente, "Superfine Thermoplastic Fibers", *Industrial & Engineering Chem.*, V.48, N.8, pp. 1342–1346, 1956.

V.A. Wente, "Manufacture of Superfine Organic Fibers", *Navy Res. Lab.* Washinton, D.C., NRL Rpt. 4364 (111437), May 25, 1954. U.S. Dept. of Commerce, Office of Technical Services.

R.R. Butin, et al., "Melt Blowing—A One Step Web Process for New Nonwoven Products", *Journal of the Tech. Assoc. of The Pulp and Paper Industry*, V. 56, N.4, pp. 74–77, 1973.

B.S. Sprague, "Relationship of Structure and Morphology to Properties of Hard Elastic Fibers and Films", *Journal of Macromol. Sci.–Phys.*, B8, (1–2), 157–187, (1973).

S.L. Cannon, et al., "Hard–Elastic Fibers ( A Review of A Novel State for Crystalline Polymers)", *J. Polymer Science: Macromolecular Reviews*, vol. 11, pp. 209–275, (1976).

Polypropylene Structure, blends and composites, vol. 2, *Chapman & Hall*, pp. 17–23.

Encyclopedia of Polymer Science And Engineering, vol. 7, John Wiley & Sons, Inc., pp. 73–91.

Encyclopedia of Chemical Technology, vol. 10, John Wiley & Sons, Inc., pp. 761–783.

Primary Examiner—Rena L. Dye
Attorney, Agent, or Firm—William E. Maycock

[57] ABSTRACT

A fluid-tight container adapted to contain a fluid, volatile solid, or absorbent for a fluid, in which at least a portion of the container includes a material which, when sufficiently stretched, develops sufficient porosity to allow passage of the fluid through the material. In some embodiments, the material may be a film. For example, the film may be a filled film. As another example, the film may be an elastic film, such as a hard-elastic film. In other embodiments, the material may be a laminate. Components of the laminate may be a film or a nonwoven web, in which case the film may be a filled film or an elastic film, such as a hard-elastic film. Desirably, the laminate will include a film and a nonwoven web. The fluid-tight container may include a fluid-absorbing solid, such as silica gel or activated carbon for absorbing moisture or odors. In such case, the movement of fluid through the material is into the container. Alternatively, the fluid-tight container may include a liquid. For example, the container may include a gel, cream, or lotion, in which case the movement of fluid through the material is from the container. Also provided is a method of dispensing a liquid which involves providing a fluid-tight container as described above, providing a liquid in the fluid-tight container, and stretching the container.

19 Claims, No Drawings

STRETCH-ACTIVATED CONTAINER

This application is a continuation of application Ser. No. 08/493,766 entitled "STRETCH-ACTIVATED CONTAINER" and filed in the U.S. Patent and Trademark Office on Jun. 22, 1995, now U.S. Pat. No. 5,741,564. The entirety of this application is hereby incorporated by reference.

BACKGROUND OF THE INVENTION

The present invention relates to a container, such as a container for a solid or a fluid, e.g., a liquid or volatile material.

Numerous devices for dispensing a material are known. Such devices range from a simple cloth to complex packages or containers for the controlled release of the material to be dispensed. Moreover, the material to be dispensed can be a solid, liquid, or gas.

Dispensing cloths include wet wipes and cloths impregnated with oil, lotion, or soap, all of which are concerned with skin care, particularly for infants. Dispensing cloths also have been employed for cleaning hard surfaces. Devices functionally equivalent to dispensing cloths utilize a microporous polymer for the dispensing of a wide variety of liquids, such as lubricants, surfactants, slip agents, moth repellents, pesticides, plasticizers, medicinals, fuel additives, polishing agents, stabilizers, insect and animal repellents, fragrances, flame retardants, antioxidants, odor-masking agents, antifogging agents and perfumes. Some cloths utilize microcapsules which may be ruptured to dispense a material.

More complex packages for dispensing a material are exemplified by a disposable swab having a rupturable container and a foam applicator in combination and a scrub sponge having a closed chamber which includes a closed, puncturable chamber containing a liquid scrub agent and a puncture member. Another puncturable package is employed in a disposable liquid applicator for the cleaning and waxing of floors and other surfaces. Other containers are utilized for dispensing a vapor from a volatile liquid.

A variety of laundry-related containers have been devised. These include containers for dispensing hydrogen peroxide into a clothes dryer for the bleaching of textiles, introducing detergent into a washer, and introducing detergent into a washer and fabric softener into a dryer by means of a single container.

Notwithstanding the creativity applied in the past to the dispensing of materials, there still is a need for improvements. For example, many of the known dispensers require either using all of the material contained therein or storing the opened dispenser in another storage device, such as an air-tight container. Moreover, the known dispensers generally do not provide for re-use at a later time; that is, the opening of the dispenser typically is not reversible.

SUMMARY OF THE INVENTION

The present invention addresses some of the difficulties and problems discussed above by providing a fluid-tight container adapted to contain a fluid, wherein at least a portion of the container comprises a material which, when sufficiently stretched, develops sufficient porosity to allow passage of the fluid through the material.

In some embodiments, the material may be a film. For example, the film may be a filled film. As another example, the film may be an elastic film, such as a hard-elastic film. In other embodiments, the material may be a laminate. Components of the laminate may be a film or a nonwoven web, in which case the film may be a filled film or a hard-elastic film. Desirably, the laminate will include a film and a nonwoven web. For example, the laminate may be a laminate of a film and a nonwoven web or a laminate of a first nonwoven web, a film, and a second nonwoven web.

The fluid-tight container may include a fluid-absorbing solid, such as silica gel or activated carbon for absorbing moisture or odors. In such case, the movement of fluid through the material is into the container.

Alternatively, the fluid-tight container may include a liquid. For example, the container may include a gel, cream, lotion, or solution, in which case the movement of fluid through the material is from the container.

The present invention also provides a method of dispensing a liquid which involves providing a fluid-tight container as described above, providing a liquid in the fluid-tight container, and stretching the container. The liquid desirably will be a gel, cream, lotion, or solution.

DETAILED DESCRIPTION OF THE INVENTION

As used herein, the term "fluid-tight container" means that the container is impervious to gases or liquids, or to both gases and liquids. For example, the container may be pervious to gases, but impervious to liquids, in which case the container is a liquid-tight container. The term "fluid" is intended to include both gases and liquids.

The terms "porosity" and "connected porosity" are used herein to mean surface-connected pores, i.e, typically tortuous passageways or pores which extend from one surface of a material to the other surface.

The term "film" is used herein to mean a flat section of a thermoplastic polymer whose thickness is very thin in relation to its width and length. A film having a plurality of tortuous paths or passageways which permit the passage through the film of gases (i.e., porosity), including water vapor, but which is impervious to liquids present in the container or to which the container may be exposed, is referred to herein as a "microporous film."

A "filled film" is a film which includes particulate matter which is insoluble in the thermoplastic polymer from which the film was prepared. The particulate matter, or "filler," generally is present at levels greater than about 25 percent by weight, based on the weight of the polymer, and often is present at levels greater than about 50 percent by weight. For example, the filler may be present at a level of from about 25 to about 80 percent by weight. As another example, the filler may be present at a level of from about 60 to about 65 percent by weight, as described in the examples. As is well known in the art, some filled films develop connected porosity upon being stretched. However, the development of such porosity is irreversible.

As used herein, the term "hard-elastic film" is meant to include a film prepared from a polymer capable of exhibiting a high degree of crystallinity under conditions such that the film possesses not only increased modulus and tenacity, but also unexpectedly large extensibility and high elastic recovery from large extensions. Such films (as well as fibers) also have been referred to in the art as "high modulus-high recovery" and "springy" films (and fibers). See, for example, S. L. Cannon et al., *J. Polymer Sci.: Macromolecular Reviews*, 11, 209–275 (1976); and B. S. Sprague, *J. Macromol. Sci.-Phys.*, B8(1–2), 157–187 (1973).

The highly crystalline polymers develop row-nucleated structures of stacked lamellar aggregates which can be further perfected by annealing. Hard-elastic films (and fibers) show abnormally high recovery from very high strains, a negative temperature coefficient of retractive force, and high deformability with good recovery at liquid nitrogen temperature. More importantly, such films show a reversible reduction in density on stretching with the generation of large, surface-connected pores. Upon being stretched, hard-elastic films become porous and, as a consequence, permeable to liquids. Unlike filled films, the porosity developed by hard-elastic films is reversed upon removal of the stress.

Examples of polymers from which hard-elastic films may be prepared include polyethylene, polypropylenepolyoxymethylene copolymers (Celcon), poly(3-methylbutene), poly(4-methylpentene), poly(ethylene sulfide), polypivalocatone, and, when specially annealed, nylon 6—6.

The term "fibrous material" is used broadly herein to mean any sheet or web which is composed, at least in part, of fibers of any length. Thus, the fabric can be a woven or nonwoven sheet or web, all of which are readily prepared by methods well known to those having ordinary skill in the art. For example, nonwoven webs are prepared by such processes as meltblowing, coforming, spunbonding, and carding. Moreover, the fabric can consist of a single layer or multiple layers. When multiple layers are present, only one needs to be fibrous. Thus, a multilayered fabric can include films, scrim, and other nonfibrous materials.

As used herein, the term "nonwoven web" means a web having a structure of individual fibers or threads which are interlaid, but not in an identifiable manner as in a knitted fabric. Nonwoven webs are readily prepared by known processes, such as meltblowing, coforming, spunbonding, air laying, wet laying, and the like.

The fluid-tight container of the present invention is adapted to contain a fluid, volatile solid, or absorbent for a fluid. In general, at least a portion of the container includes a material which, when sufficiently stretched, develops sufficient porosity to allow passage of the fluid through the material. For convenience, the term "stretchable material" is used herein to mean a material which, when sufficiently stretched, develops the required porosity.

The container may be of any size and shape. For example, the container may be formed from two identical pieces of a stretchable material which are overlaid and sealed around the edges to define a fluid-tight volume or reservoir therebetween. Alternatively, one of the pieces may be a stretchable material and the other piece may be a "stretchable layer;" the term is used herein to mean a layer which remains impervious to fluid after stretching.

The stretchable material may consist of a single layer or it may include two or more layers bonded together as a laminate. By way of illustration, the stretchable material may be a film. For example, the film may be a filled film. As another example, the film may be a hard-elastic film. Further by way of illustration, the material may be a laminate. Components of the laminate may be a film or a nonwoven web, in which case the film may be a filled film or a hard-elastic film. Desirably, the laminate will include a film and a nonwoven web. For example, the laminate may be a laminate of a film and a nonwoven web or a laminate of a first nonwoven web, a film, and a second nonwoven web.

As already noted, the nonwoven web may be a nonwoven web prepared by such known processes as meltblowing, coforming, spunbonding, air laying, wet laying, and the like. As a practical matter, nonwoven webs prepared by meltblowing, coforming, and spunbonding are especially useful. By way of illustration only, such processes are exemplified by the following references, each of which is incorporated herein by reference:

(a) meltblowing references include, by way of example, U.S. Pat. No. 3,016,599 to R. W. Perry, Jr., U.S. Pat. No. 3,704,198 to J. S. Prentice, U.S. Pat. No. 3,755,527 to J. P. Keller et al., U.S. Pat. No. 3,849,241 to R. R. Butin et al., U.S. Pat. No. 3,978,185 to R. R. Butin et al., and U.S. Pat. No. 4,663,220 to T. J. Wisneski et al. See, also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No.4, pp. 74–77 (1973);

(b) coforming references include U.S. Pat. No. 4,100,324 to R. A. Anderson et al. and U.S. Pat. No. 4,118,531 to E. R. Hauser; and (c) spunbonding references include, among others, U.S. Pat. No. 3,341,394 to Kinney, U.S. Pat. No. 3,655,862 to Dorschner et al., U.S. Pat. No. 3,692,618 to Dorschner et al., U.S. Pat. No. 3,705,068 to Dobo et al., U.S. Pat. No. 3,802,817 to Matsuki et al., U.S. Pat. No. 3,853,651 to Porte, U.S. Pat. No. 4,064,605 to Akiyama et al., U.S. Pat. No. 4,091,140 to Harmon, U.S. Pat. No. 4,100,319 to Schwartz, U.S. Pat. No. 4,340,563 to Appel and Morman, U.S. Pat. No. 4,405,297 to Appel and Morman, U.S. Pat. No. 4,434,204 to Hartman et al., U.S. Pat. No. 4,627,811 to Greiser and Wagner, and U.S. Pat. No. 4,644,045 to Fowells.

In general, the polymer matrix of the stretchable material may be made from any thermoplastic polymer which possesses elastic properties. Examples of such thermoplastic polymers include, by way of example only, acrylonitrile-butadiene-styrene copolymers; cellophane; cellulose acetate; cellulose triacetate; fluorocarbon polymers, such as ethylene-tetrafluoroethylene copolymers, fluorinated ethylene-propylene copolymers, poly(chlorotrifluoroethylene), poly(tetrafluoroethylene), and poly(vinyl fluoride); ionomers; polyamides, such as nylon 6; polycarbonates; polyesters, such as poly(ethyleneterephthalate); polyimides; polyethylenes, such as low density polyethylenes, linear low density polyethylenes, medium density polyethylenes, high density polyethylenes, and ultrahigh molecular weight polyethylenes; polypropylenes; polystyrenes; and rigid and plasticized poly(vinyl chloride).

Depending upon the nature of the stretchable material, the fluid-tight container of the present invention may be adapted for a single use or for multiple uses. For example, when the stretchable material is a filled film, the development of pores in the film by stretching is not reversible. That is, once formed, the pores remain in the film after the removal of the stress. Thus, a container made from a filled film is a single-use container. However, the use of an elastic film, such as a hard-elastic film, as the stretchable material permits multiple uses since the removal of the stress closes the pores which were formed by stretching.

Most commonly, a fluid to be dispensed will be present in the fluid-tight container of the present invention. For example, the fluid may be a liquid, such as a gel, cream, lotion, or solution. As examples of suitable liquids, the following may be mentioned by way of illustration only:

hand and body lotions, cleansing creams, baby oil, disinfecting solutions, cleansing solutions, medicating gels, insect repellent solutions, sunscreen lotions and oils, tanning lotions and oils, and the like.

A liquid need not be present in the container. Moreover, the movement of a fluid through the stretchable material need not be from inside the container to the outside. For example, a solid may be present in the container. By way of illustration, the solid may be an absorbent such as activated carbon or silica gel. In such case, the movement of fluid generally will be from outside the container to the inside, and the fluid typically will be a gas, such as water vapor or a malodorous gas or vapor. Alternatively, the solid present in the container may consist of a material which sublimes, such as naphthalene, in which case molecules of naphthalene vapor will move from inside the container to the outside.

Turning now to the method of the present invention, a liquid may be dispensed by providing a fluid-tight container as described hereinbefore, providing a liquid in the fluid-tight container, and stretching the container. Upon stretching the container, pores are formed which allow a fluid to egress from the container. The fluid typically will be a liquid.

In addition, a fluid may be captured within a container by providing a fluid-tight container, wherein at least a portion of the container includes a material which, when sufficiently stretched, develops sufficient porosity to allow passage of the fluid through the material. Provided in the fluid-tight container is a fluid-absorbing solid, such as activated carbon or silica gel. Upon stretching the container, fluid is able to pass from outside the container, through the material which has been stretched, to inside the container where the fluid is absorbed by the fluid-absorbing material.

The present invention is further described by the examples which follow. Such examples, however, are not to be construed as limiting in any way either the spirit or the scope of the present invention. In the examples, water containing a surfactant was employed as a model for any water-based cleaning solution, home care, personal care, or skin care product; alcohol for any alcohol- or organic solvent-based product; and naphthalene for any solid released by sublimation.

EXAMPLE 1

A nonwoven/film laminate was prepared by thermally point bonding essentially as described in, for example, U.S. Pat. No. 3,855,046 to Hansen et al. and U.S. Pat. No. 4,493,868 to Meitner, a 0.5 ounce per square yard or osy (about 17 grams per square meter or gsm) polypropylene spunbonded nonwoven web to a 0.5 osy (about 17 gsm) microporous film.

The spunbonded nonwoven web was produced essentially as described in U.S. Pat. No. 3,802,817 to Matsuki. The web was thermally point bonded before laminating, with a total bond area of about 15 percent.

The film formulation contained, on a total weight percent basis, 65 percent English China Supercoat calcium carbonate ($CaCO_3$) with a 1 micron average particle size and a 7 micron top cut. The calcium carbonate was obtained from ECCA Calcium Products, Inc. in Sylacauga, Ala., a division of ECC International. The calcium carbonate was blended with 15 percent by weight of linear low density polyethylene made from a blend of Dowlex® 2517 linear low density polyethylene and Dowlex® 2532 linear low density polyethylene blended in a weight ratio of 1:4 such that the melt index of the blend was 10 g/10 minutes. The melt index was determined in accordance with ASTM Method D 1238-82, Standard Test Method for Flow Rates of Thermoplastics by Extrusion Plastometer, using a Model VE 4-78 Extrusion Plastometer (Tinius Olsen Testing Machine Company, Willow Grove, Pa.) having an orifice diameter of 2.0955±0.0051 mm at a temperature of 190° C. and a load of 2.16 kg. The Dowlex® polymers are available from Dow Chemical U.S.A., Midland, Mich. The remaining 20 percent by weight of the formulation comprised Himont KSO51P polypropylene-based polymer from Himont, USA (Wilmington, Del.). The KSO51P polymer is an olefinic thermoplastic elastomer or TPO multistep reactor product wherein an amorphous ethylene-propylene random copolymer is molecularly dispersed in a predominately semicrystalline high propylene monomer/low ethylene monomer continuous matrix. The amorphous component acts as a tackifying or bonding agent as it begins to soften at about 55° C.

The film formulations was blown into a film at a melt temperature of 191° C. at a blow up ratio of approximately 1.7 to produce a film having an unstretched basis weight of approximately 50 gsm. The film subsequently was stretched on a machine direction orientation (MDO) unit at a stretch ratio of 3× and at a temperature of 60° C. The resultant film was breathable (i.e., permeable to water vapor) and had a basis weight of approximately 14 gsm.

Two samples, each 3 inches by 3 inches (about 7.6 cm by 7.6 cm) were placed together, film-side to film-side, and thermally bonded or sealed along three of the four edges by means of a Vertrod Thermal Impulse Heat Sealer (Model 14P, Vertrod Corporation) to form a pouch open along one edge. Three ml of isopropanol colored with ink was introduced into the pouch through the open edge which then was thermally sealed as described above. The procedure was repeated, except that the isopropanol solution was replaced with water colored with ink.

In each case, the liquid remained in the pouch without leakage through the sealed edges or the laminate. However, a slow weight loss over time was observed as a result of the permeability of the laminate to isopropanol and water vapor.

Upon manually stretching either pouch in any direction, larger pores were formed in the film layer of the laminate, thereby allowing liquid to flow through the laminate and wick or spread over the spunbonded layer of the laminate in a controllable manner. That is, while the formation of larger pores by stretching was not reversible, the size of the pores and, consequently, the rate of flow of liquid through the laminate, were readily controlled by the stretching force applied to the pouch. In other words, the rate of flow of liquid out of the pouch was directly proportional to the stretching force applied. The liquid was transferred to the skin by wiping.

EXAMPLE 2

Pouches were prepared as described in Example 1, except that each pouch was made from an unstretched 45 gsm film having a thickness of 1.5 mils (about 38 micrometers). The film was prepared as described in Example 1 from a composition comprising 60 percent by weight calcium carbonate, 14 percent by weight of a random copolymer containing 5.5 percent by weight polyethylene and 94.5 percent by weight polypropylene, and 26 percent by weight polypropylene, except, as already noted, the film was not stretched. Separate pouches were filled with isopropanol, naphthalene, and water, respectively. The pouches were maintained at ambient temperature (about 20°–25° C.) in a constant air-flow fume hood and weight loss followed as a function of time. After one week, weight loss in each case was less than one percent. When the pouches were stretched, the film immediately became opaque, demonstrating the creation of pores in the film. Liquids contained in the pouches passed freely through the film; as the liquids passed through the film, the film again became transparent as liquid filled the pores and reduced light scattering.

EXAMPLE 3

The procedure of Example 2 was repeated, except that the pouches were prepared from a 1.5-mil (about 38-micrometer) thick filled film prepared as described in Example 2 from a composition comprising 63 percent by weight calcium carbonate, 19 percent by weight of the Dowlex® blend described in Example 1, 13 percent by weight of the random ethylene-propylene copolymer employed in Example 2, and 5 percent by weight of low density polyethylene. No weight loss was observed when the pouches were stored at ambient temperature for 24 hours. When stretched, the pouches released liquids through the pores created by stretching.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

By way of illustration, a pouch may be made as described in Example 1 from a laminate comprising, e.g., a 0.5 osy (about 17 gsm) polyethylene metallocene nonwoven web thermally bonded to a 0.8 osy (about 27 gsm) calcium carbonate-filled film. The pouch may be filled with, for example, a sunscreen lotion. When stretched, the film component of the laminate develops sufficient porosity to allow the lotion to move to and be distributed in the nonwoven web layer, thereby permitting the controlled application of lotion to skin. Less force is needed during stretching because of the higher elongation of the metallocene nonwoven web.

As a further illustration, a hard-elastic film prepared as described in U.S. Pat. No. 3,801,404 to Druin et al. or U.S. Pat. No. 5,238,760 to Takahashi et al. may be laminated to a polyethylene nonwoven web. A pouch containing, for example, mosquito repellent in an ethanol-based solution, may be made by bonding the edges with an adhesive or thermally as described in Example 1. The pouch may be activated by stretching which creates porosity in the film, thereby allowing some of the solution to wick out to the nonwoven web. As soon as the stretching force is released, the pores created by the stretching process close, allowing re-use of the pouch until the supply of repellent is depleted.

Other modifications will be apparent to those having ordinary skill in the art.

What is claimed is:

1. A method of dispensing a liquid which comprises:
   providing a fluid-tight container adapted to contain a liquid, wherein at least a portion of the container comprises a material which is initially in an unstretched condition so that the material is impervious to liquids or both gases and liquids, said material being constructed of a film that, when stretched b manual forces external to said material, forms a plurality of surface-connected Pores to allow liquids and gases to penetrate said material so that liquids and gases will pass into or out of said container at a controlled rate depending on the amount of external stretching force applied to said material;
   providing a liquid in the fluid-tight container; and
   stretching the container.

2. The method of claim 1, in which the material comprises a film.

3. The method of claim 2, in which the film is a filled film.

4. The method of claim 2, in which the film is a hard-elastic film.

5. The method of claim 1, in which the material comprises a laminate of a film and a fibrous material.

6. The method of claim 5, in which the material is a laminate of a film and a nonwoven web.

7. The method of claim 5, in which the material is a laminate of a first nonwoven web, a film, and a second nonwoven web.

8. The method of claim 5, in which the film is a filled film.

9. The method of claim 5, in which the film is a hard-elastic film.

10. The method of claim 1, in which the liquid is selected from the group consisting of a gel, cream, and lotion.

11. A method of capturing a fluid within a container which comprises:
    providing a fluid-tight container, wherein at least a portion of the container comprises a material which is initially in an unstretched condition so that the material is impervious to liquids or both gases and liquids, said material being constructed of a film that, when stretched by manual forces external to said material, forms a plurality of surface-connected pores to allow liquids and gases to penetrate said material so that liquids and gases will pass into or out of said container at a controlled rate depending on the amount of external stretching force applied to said material;
    providing a fluid-absorbing solid in the fluid-tight container; and
    stretching the container.

12. The method of claim 11, in which the material comprises a film.

13. The method of claim 12, in which the film is a filled film.

14. The method of claim 12, in which the film is a hard-elastic film.

15. The method of claim 11, in which the material comprises a laminate of a film and a fibrous material.

16. The method of claim 15, in which the material is a laminate of a film and a nonwoven web.

17. The method of claim 15, in which the material is a laminate of a first nonwoven web, a film, and a second nonwoven web.

18. The method of claim 15, in which the film is a filled film.

19. The method of claim 15, in which the film is a hard-elastic film.

* * * * *